United States Patent [19]

Scruggs

[11] Patent Number: 4,484,750
[45] Date of Patent: Nov. 27, 1984

[54] HIGH PRESSURE SEAL JOINT

[75] Inventor: David M. Scruggs, San Juan Capistrano, Calif.

[73] Assignee: Dresser Industries, Inc., Dallas, Tex.

[21] Appl. No.: 548,542

[22] Filed: Nov. 3, 1983

Related U.S. Application Data

[63] Continuation-in-part of Ser. No. 394,191, Jul. 1, 1982, abandoned.

[51] Int. Cl.³ .......................... F16J 9/00; F16K 41/00; F16L 53/00; F16L 13/00
[52] U.S. Cl. ..................................... 277/9; 277/81 R; 285/41; 285/284; 285/DIG. 18
[58] Field of Search ................... 277/9, 198, 53, 81 R; 285/41, 187, 284, DIG. 18

[56] References Cited

U.S. PATENT DOCUMENTS

| 2,110,864 | 3/1935 | Batesole | 277/53 X |
| 2,646,065 | 7/1953 | Tyson | 137/246 |
| 2,939,753 | 6/1960 | Schilling et al. | 309/3 |
| 3,018,789 | 1/1962 | Pagonis | 137/341 |
| 3,139,009 | 6/1964 | Harting | 92/171 |
| 3,195,552 | 7/1965 | Rasmussen | 137/15 |
| 3,381,703 | 5/1968 | Hutkin | 137/341 |
| 3,865,387 | 2/1975 | Larker et al. | 277/190 |
| 4,099,725 | 7/1978 | Wolters | 277/1 |

FOREIGN PATENT DOCUMENTS

| 919101 | 2/1963 | United Kingdom | 277/198 |
| 642052 | 9/1978 | U.S.S.R. | 285/41 |

Primary Examiner—Stuart S. Levy
Assistant Examiner—Lloyd D. Doigan
Attorney, Agent, or Firm—William R. Peoples

[57] ABSTRACT

A joint includes two members with facing surface sections sealed together by a meltable seal material contained within a reservoir between the surface sections. A non-capillary recess in one of the members adjacent one surface section keeps the seal material from flowing out of the reservoir between the members by capillary action when the seal material is melted to form or reform the seal between the members.

14 Claims, 5 Drawing Figures

HIGH PRESSURE SEAL JOINT

CROSS REFERENCE TO RELATED APPLICATION

This a continuation-in-part of application Ser. No. 394,191 filed July 1, 1982, by David Milton Scruggs and entitled IMPROVED HIGH PRESSURE SEAL JOINT now abandoned.

TECHNICAL FIELD

This invention relates to a joint such as is sealed against leakage of high pressure fluid from between first and second members.

BACKGROUND ART

On pipe joints, valves, housing closures and like structures subjected to heat and high pressure fluid conditions, it may be important that the fluid be kept from leaking from the joint and in the event of leakage, that means be provided for quick, easy and effective repair of the leaking joint. For example, repair of leaking joints in the steam pipes of a power plant presently may require time consuming disassembly to replace seal material to correct leakage at the joint.

One prior valve arrangement as disclosed in U.S. Pat. No. 3,195,552, utilizes a meltable material as a horizontal valve seat so that the seat may be reformed in situ by heating and without need for disassemblying the valve.

DISCLOSURE OF THE INVENTION

The present invention contemplates a high pressure seal joint utilizing a meltable seal material between first and second members in the joint to reform the seal between the members in situ without loss of the seal material from the joint regardless of the orientation of the seal material relative to horizontal.

More specifically, herein, the invention resides in the novel construction of the joint to include quell means providing interruption of capillary flow of melted material. Effective sealing also is aided by virtue of the use of a seal material having a wetting angle ideally approaching 90° or more generally having a sessile drop characteristic whose base b is generally within the range relative to its height h of $h/4 \leq b \leq 6h$. Herein, the term sessile drop refers generally to a liquid drop of a substance on a flat surface of a material and from which drop the physical characteristics relating to shape may be determined.

The foregoing and other features and advantages of the present invention will become more apparent from the following description of the best mode of carrying out the invention when taken in conjunction with the accompanying drawings.

BEST MODE OF CARRYING OUT THE INVENTION

Figure 1:
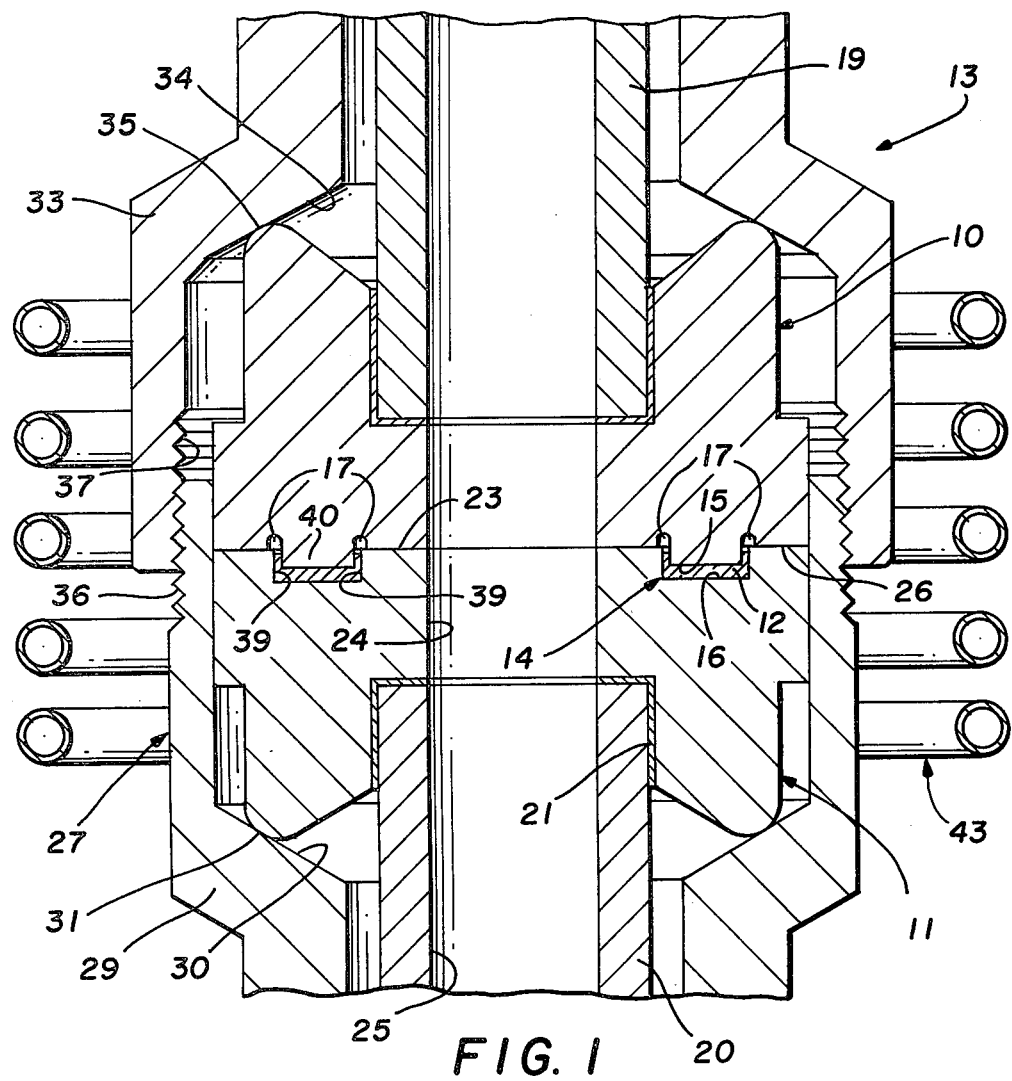
FIG. 1 is a cross-sectional view of a pipe joint embodying the novel features of the present invention.

As shown in the drawings for purposes of illustration, the present invention is embodied in a unique joint construction particularly designed for use in high pressure and heat environments to keep fluid from leaking between two different members 10 and 11 while providing for quick and easy resealing in the event leakage should occur. For example, a joint 13 of the present type may be used to connect together abutting ends of steam pipes in a nuclear reactor or in attaching a valve housing to a pipe or any other construction where the loss of a seal in the joint may otherwise require extensive, time-consuming disassembly procedures to be followed in order to correct the leakage. Accordingly, the present invention contemplates construction of the joint 13 with a reservoir 14 containing a meltable metal seal material 12 disposed between surface sections 15 and 16 on the members 10 and 11, respectively, and quell means 17 within the joint to keep the material from flowing by capillary action from between the members when the material is heated and melted to form sealing contact between the members 10 and 11.

Figure 3:
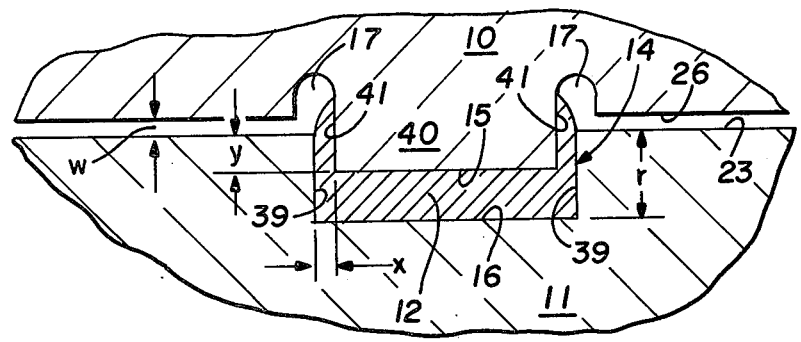
FIG. 3 is an enlarged elevational view of a portion of the joint illustrated in FIG. 1.

In the exemplary form of the present invention, the joint 13 is shown as utilized in connecting together facing ends of upper and lower pipes 19 and 20. However, vertical orientation of the pipes is not critical as they may be oriented to extend horizontally or substantially in any angular position relative thereto without loss in resealing capability of the joint. As shown in FIGS. 1 and 3, lower member 11 in the form of an end fitting is secured to the lower pipe 20 with the latter being received within an annular recess 21 and permanently attached to the fitting 11 such as by brazing or the like. The upper end of the lower fitting includes a substantially flat end surface 23 extending radially outward from a central opening 24 aligned with a central passage 25 through the pipe. In similar fashion, an upper member or upper fitting 10 is secured to the upper pipe and includes a radial end surface 26 facing the surface 23 of the lower fitting 11. In use, the two surfaces 26 and 23 of the upper and lower fitting members 10 and 11 abut each other with mechanical connecting means 27 securing the members against separation.

Herein, the mechanical connection means 27 includes a lower collar 29 telescoped upwardly over the lower pipe 11. An internal shoulder 30 on the collar abuts a rounded lower end 31 of the lower fitting to limit upward movement relative to the fitting. Similarly, an upper collar 33 is telescoped downwardly over the upper pipe 10 with an internal shoulder 34 abutting the upper end 35 of the upper fitting 10. In securing the pipes together, an externally threaded section 36 of the lower collar mates with an internally threaded section 37 of the upper collar so that as the collars are threaded together, the internal shoulders 30 and 34 acting in opposite directions against the fittings 11 and 10 force the two end surfaces 23 and 26 toward and into abutting engagement with each other.

To keep heated high pressure fluid from leaking between the upper and lower members 10 and 11 of the joint 13, the seal material 12 is disposed between the members 10 and 11 within the reservoir 14. In the present embodiment, the reservoir 14 is defined by a continuous annular groove 14 formed in the lower fitting 11 and opening upwardly from the radial end surface 23. More specifically, the groove is defined by radially spaced concentric side walls 39 extending in a generally axial direction relative to the central opening 24 of the fitting and a bottom wall which is defined by the surface section 16 extending radially between the two side walls. Mating with the groove 14 is an annular projection 40 which is formed integrally with the upper member 10 and protrudes in a generally axial direction downwardly from the upper end surface 26 thereof. Herein, the projection also comprises radially spaced concentric side walls 41 extending in a generally axial direction relative to the central opening of the upper fitting and includes a free end surface section 15 joining together the sidewalls 41. With the projection telescoped into the groove, the sidewalls 39 and 41 of the groove and projection generally are parallel with each other and the surface sections 16 and 15 generally are parallel with each other.

Figure 5:
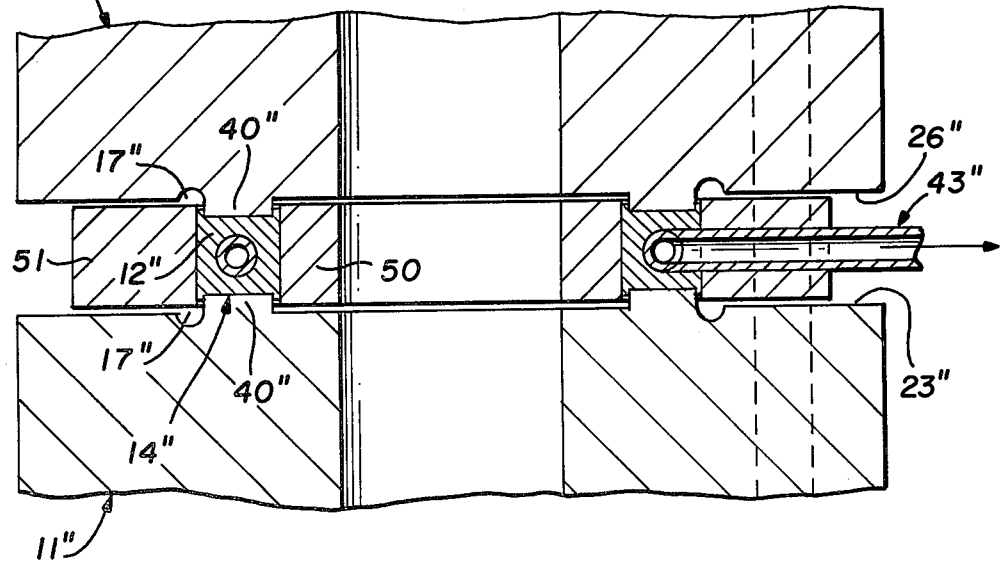

More particularly, as shown in FIG. 5, a novel relationship exists between the groove 14 and the projection 40 and in relation to the mean capillary clearance existing between the end surfaces 23 and 26. Herein, the term mean capillary clearance refers to that clearance generally existing between the end surfaces as a result of the relative roughness of the two surfaces when in abutting engagement, it being appreciated that it is virtually impossible to provide perfectly flat abutting surfaces without expensive machining of such surfaces. Preferably the depth of the groove 14 beyond the distance which the projection 40 extends into the groove, is such as to be no less than twice the thickness of the mean capillary clearance existing between the upper and lower surfaces 10 and 11. Additionally, the extent to which the projection protrudes into the groove is approximately five times the width of the clearance between adjacent sidewalls 39 and 40 of the groove and projection, respectively, so that, when the seal material 12 is melted, cooling occurs first between these side walls. In this way, it is believed any voids which might develop in the seal material will be concentrated within the reservoir 14 without weakening the strength of the seal between the members 10 and 11.

In the embodiment of the invention shown in FIG. 1, an induction coil 43 surrounding the joint 13 is utilized to heat the seal material 12, melting it to wet the surfaces contacted by the material on both the upper and lower members 10 and 11. Accordingly, both the side walls 39 and 41 of the groove and of the projection are wetted by the melted seal material as well as the surface sections 15 and 16 so as to effectively seal against fluid leakage between the members when the material solidifies during cooling.

In accordance with the main feature of the present invention, melted seal material 12 is kept from being lost from between the upper and lower members 10 and 11 through the use of the novel quell means 17 in one of the members to keep the melted seal material from flowing by capillary action through the capillary clearance space between the members. For this purpose, a non-capillary recess 17 is formed in the member adjacent the projection 40 as an interruption to potential flow of material through the capillary clearance space. Advantageously, as a result of this construction, repeated heating and reforming of the effective sealing contact between the members is possible without having to disassemble the joint 13 or having to replace lost seal material.

In the present instance, the quell means 17 utilized in the FIG. 1 embodiment includes two of the noncapillary recesses 17 formed in the upper member 10. An outer recess is formed in the surface 26 along the radially outward side wall of the projection 40 and an inner recess is formed in the surface 26 along the radially inward side wall concentric with the outer recess. Both recesses are annularly continuous and include rounded bottoms with the cross-sectional width of the recesses being such as to interrupt capillary flow of the seal material when the latter is melted to form or reform a fluid tight seal between the members 10 and 11.

Figure 2:
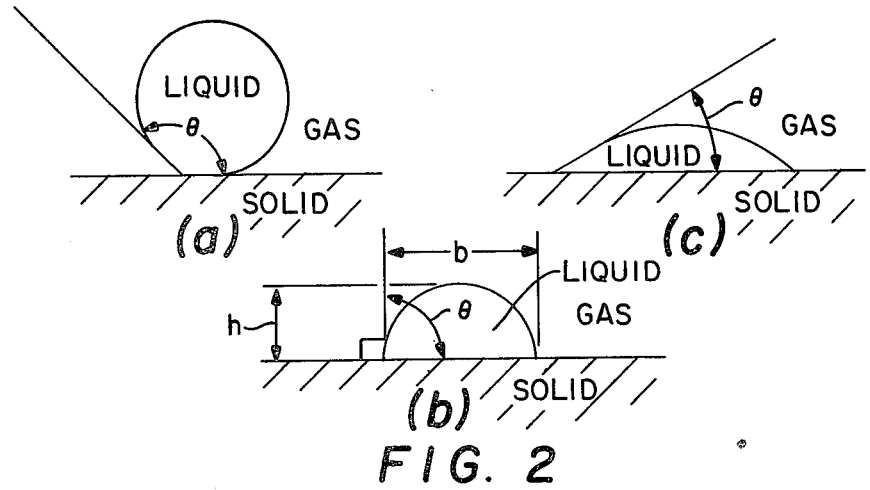
FIGS. 2a, b and c are schematic elevational views of sessile drops of seal material usable in the joint of the present invention.

Further, to keep the seal material from flowing by capillary action out of the joint 13 the seal material is formed of a meltable metal having a sessile drop characteristic indicative of resistance to spreading, such as CERROBEND metal (produced by Cerro Corporation consisting of 50% Bi, 26.7% Pb, 13.3% Sn, and 10% Cd. Additionally, while the wetting of surfaces on the members 10 and 11 is desirable to create an effective seal, the use of flux and bonding of the seal material to either of the members is avoided in order to keep the seal material as a cohesive mass to aid in sealing when reheating to reform the seal after a leak has occurred. Because of these desirable characteristics, contact of the seal material with the members 10 and 11 differs substantially from conventional brazing. In brazing, for example, the brazing material may be used to form a load bearing joint and desirably both wets and spreads. When bonding members together brazing requires the use of flux to insure good bonding. Brazing also requires whole area heating, that is, both of the bonded surfaces of the members and the braze material itself and further requires close fitting together of the parts to be brazed. In contrast, the present invention does not require precision formation of the end surfaces 23 and 26 of the members 11 and 10. Moreover, flux is not used in conjunction with the seal material 12 of the present joint structure nor is it necessary to provide whole area heating, it being sufficient to melt the material so it contacts the surfaces to be sealed. Furthermore, the seal material carries no substantial mechanical load in torque, but rather, functions as a non-load bearing seal in a manner similar to conventional elastomeric seal elements. Specifically herein, the seal material 12 utilized has a sessile drop characteristic such that the wetting angle $\theta$, thereof, generally approaches an ideal 90° (see FIGS. 2a, b and c) and may be characterized more specifically, as having a base b and height h of drop generally defined by the expression, $h/4 \leq b \leq 6h$. Examples of suitable seal material for use on steel in addition to the aforementioned CERROBEND include Al, AlSi, and CuAg.

Figure 4:
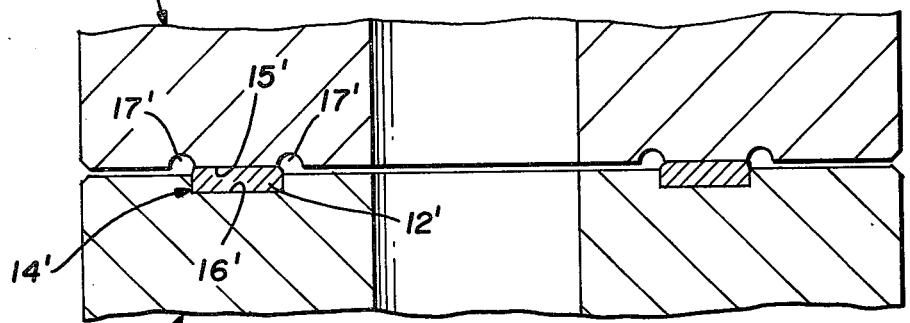
FIGS. 4 and 5 are fragmentary elevational views of portions of alternate embodiments of joints employing the novel features of the present invention.

Alternative embodiments of the present invention are shown in FIGS. 4 and 5. In the FIG. 4 version, parts similar to those of the first embodiment are identified by the same but primed reference numbers. Also, parts illustrating the mechanical connection between the upper and lower members 10' and 11', and the means for heating the seal material in the reservoir 14' have been omitted for purposes of clarity of illustration. The primary difference in the FIG. 4 embodiment over the embodiment illustrated in FIG. 1 is that the surface section 15' of the projection 40' is coplanar with the end surface 26' of the upper member 10' and thus is not disposed within the groove 14 in the lower member 11. Accordingly, the non-capillary recesses 17' on either side of the surface section 15' effectively define the projection 40'.

In the FIG. 5 embodiment, like components of the joint 13 are identified by double primed reference numbers. In this embodiment, the primary difference over the FIG. 1 embodiment resides in the construction of the reservoir 14″ as within parts separate from the lower member 11″ and in the provision of the heating means 43″ directly within the reservoir 14″. Specifically, the reservoir is defined by radially-spaced concentric inner and outer spacer rings 50 and 51. The annular space between the rings defines the reservoir in a radial direction while projections 40″ on both the upper and lower members 10″ and 11″ define the upper and lower boundaries of the reservoir in an axial direction. As shown, the upper and lower members 10″ and 11″ advantageously are of identical construction with a single non-capillary recess 17″ concentrically positioned adjacent and radially outward of the projection within the end surface 26″ or 23″ of each member. Advantageously, with this arrangement heating of the seal material 12″ in the reservoir may be achieved directly without need of substantial heating of other parts of the joint when forming or reforming the seal between the upper and lower members 10″ and 11″. As in the FIG. 4 embodiment of the present invention, the means for mechanically connecting the members 10″ and 11″ together have been omitted from the FIG. 5 embodiment for clarity of illustration.

In view of the foregoing, it will be appreciated that the present invention brings to the art a new and particularly useful joint construction effective for forming and reforming a seal between two members 10 and 11 without need for disassembly and replacement of seal parts and particularly, without loss of the seal material 12 from between the members when the seal material is melted to form the seal. Advantageously, this is achieved through the provision of quell means 17 in the form of the non-capillary recess adjacent the surfaces of the two members which are wetted by the seal material to provide the fluid tight seal required.

The embodiments of the invention in which an exclusive property or privilege is claimed are defined as follows:

1. A joint comprising first and second members with a first surface on said first member abutting a second surface on said second member so as to define a capillary clearance therebetween, a groove formed in said first surface and a projection integrally formed with said second member and protruding from said second surface into said groove, a meltable seal material disposed within said groove in wetted contact with the sides of said groove and said projection and originally sealing against high pressure fluid leakage between members, quell means on one of said members adjacent opposite sides of said projection to keep said material from flowing through said capillary clearance by capillary action from between said members when said material is heated and melted, and means separate from said seal material for mechanically connecting said first and second members together to allow said material to be heated to rewet the sides of said groove and said projection so as to reform the original seal between said first and second members in the event the original seal begins to leak.

2. A joint comprising first and second members with a first surface on said first member abutting a second surface on said second member and defining a mean capillary clearance therebetween, a groove formed in said first surface and having a preselected width and a preselected depth the latter of which is no less than twice the mean capillary clearance between said first and second surfaces, a projection integrally formed with said second member and protruding from said second surface into said groove with said projection having a height and width less than said preselected depth and width of said groove, a meltable seal material disposed within said groove in wetted contact with both said first and second members and originally sealing against high pressure fluid leakage between said members, said meltable seal material having a sessile drop characteristic such that the base, (b), and height, (h), of the drop are related generally by the expression $h/4 \leq b \leq 6h$, quell means on one of said members adjacent opposite sides of said projection to keep said material from flowing through the mean capillary clearance between said members when said material is heated and melted to rewet said first and second members, and means separate from said seal material for mechanically connecting said first and second members together to allow said material to be heated to reform the original seal between said first and second members in the event the original seal begins to leak.

3. A joint comprising first and second members each having a defined surface section, said surface section on said first member being aligned with and facing said surface section on said second member, means defining a reservoir between said first and second surface sections, at least one capillary clearance between said surface sections of said first and second members and communicating from said reservoir to the outside of said joint, a meltable metal seal material disposed within said reservoir and forming an original seal between said first and second members in wetted contact with both said surface sections to keep high pressure fluid from leaking therebetween, quell means formed in at least one of said members adjacent said surface section to keep said seal material from flowing by capillary action from between said first and second members through said capillary clearance when said material is heated and melted, and means separate from said seal material for mechanically connecting said first and second members together to allow said material to be melted to reform the original seal therebetween in the event said original seal begins to leak.

4. A joint as defined by claim 3 wherein said quell means comprises a non-capillary recess formed in one of said first and second members.

5. A joint as defined by claim 4 including inner and outer spacer rings sandwiched between said first and second members, said outer ring being concentrically spaced from said inner ring with said reservoir being defined between said rings and said members.

6. A joint as defined by claim 5 including an annular projection integrally formed with each of said members and protruding partially into said reservoir, said defined surface sections of said first and second members comprising the outer ends of said projections, and said quell means further comprising a non-capillary recess formed in the other of said first and second members.

7. A joint as defined by claim 6 including a heating means disposed within said reservoir.

8. A joint as defined by claim 3 wherein said quell means comprises a non-capillary recess formed in said one member adjacent each side of said defined surface section in said one member.

9. A joint as defined by claim 8 wherein said reservoir comprises a groove formed in the other of said members with the bottom of said groove being said defined surface section of said other member.

10. A joint as defined by claim 9 including a projection integrally formed with said one member with said defined surface section comprising the outer end of said projection, said first member abutting said second member adjacent said projection with said capillary clearance being defined therebetween and having a mean capillary clearance said groove having a depth no less than twice said mean capillary clearance.

11. A joint as defined by claim 10 wherein said projection includes opposite sides spaced from and extending generally parallel with the sides of said groove and extending into said groove a preselected distance less than the depth thereof, said preselected distance being substantially greater than the thickness of the space between the sides of the groove and the sides of said projection.

12. A joint as defined by claim 11 wherein said preselected distance is approximately five times the thickness of the space between the sides of the groove and the sides of said projection.

13. A joint material as defined by claim 3, 4 or 8 wherein said meltable seal material is spread resistant having sessile drop characteristic such that the wetting angle thereof generally approaches 90°.

14. A joint as defined by claim 13 wherein said sessile drop characteristic of said seal material is such that the base, (b), and height, (h), of the drop are related generally by the expression, $h/4 \leq b \leq 6h$.

* * * * *